US005553228A

United States Patent [19]

Erb et al.

[11] Patent Number: 5,553,228

[45] Date of Patent: Sep. 3, 1996

[54] ACCELERATED INTERFACE BETWEEN PROCESSORS AND HARDWARE ADAPTERS

[75] Inventors: David J. Erb; Xiaoshan Z. Odom, both of Austin, Tex.

[73] Assignee: International Business Machines Corporation, Armonk, N.Y.

[21] Appl. No.: 308,340

[22] Filed: Sep. 19, 1994

[51] Int. Cl.[6] .......... G06F 15/00

[52] U.S. Cl. .......... 395/162; 395/164; 395/166; 345/132; 345/185

[58] Field of Search .......... 395/162–166; 345/24, 22, 27–28, 112, 132, 133, 185, 189, 190, 200, 201, 203

[56] References Cited

U.S. PATENT DOCUMENTS

| | | | |
|---|---|---|---|
| 4,203,154 | 5/1980 | Lampson et al. | 364/200 |
| 4,261,035 | 4/1981 | Raymond | 364/200 |
| 4,679,041 | 7/1987 | Fetter et al. | 345/139 |
| 4,882,683 | 11/1989 | Rupp et al. | 395/165 |
| 4,916,301 | 4/1990 | Mansfield et al. | 395/163 |
| 5,179,638 | 1/1993 | Dawson et al. | 395/125 |
| 5,222,205 | 6/1993 | Larson et al. | 395/130 |

OTHER PUBLICATIONS

IBM Technical Disclosure Bulletin, vol. 24, No. 6, Nov. 1981, Lowdermilk et al., "Channel–to–Channel Adapter Message Verification Mechanism", pp. 3002–3003.

IBM Technical Disclosure Bulletin, vol. 24, No. 11B, Apr. 1982, Mitchell, "SCCA Compatibility Enhancement", pp. 5972–5975.

IBM Technical Disclosure Bulletin, vol. 25, No. 11A, Apr. 1983, Calo, et al. Mechanisms for Decentralized Bandwidth . . . Facilities:, pp. 5580–5585.

IBM Technical Disclosure Bulletin, vol. 31, No. 12, May 1989, Cocuzza et al. "Adapter Card for Host–Printer Interfaces", pp. 433–434.

IBM Technical Disclosure Bulletin, vol. 21, No. 3, Aug. 1978, Mitchell, "Systems Interconnection for Distributed Processing", pp. 987–989.

IBM Technical Disclosure Bulletin, vol. 24, No. 5, Oct. 1981, Lowdermilk "Lock/Unlock Commands for Multipath Channel–to–Channel Adapter", pp. 2626–2828.

*Primary Examiner*—Kee Mei Tung
*Attorney, Agent, or Firm*—Whitham, Curtis, Whitham & McGinn; Volel Emile

[57] ABSTRACT

Overall graphics performance in a computer graphics system is improved by an accelerated interface between high performance microprocessors and hardware adapters which is a combination of hardware and software and which is independent of specific computer languages. The interface was specifically designed for any hardware attached to a central processing unit (CPU) that does not enforce the order of memory accesses. The hardware supported process fools the CPU into thinking that the write and read are accessing the same address, thus guaranteeing that the order of the write and read are correct. In a first method, a hardware pseudo-address are created on the display adapter. When the software writes to the pseudo-address, the display adapter writes the data to the coordinate register. When the software reads from the pseudo-address, the display adapter returns the contents of the actual status address. In the second method, the software writes and reads from the coordinate address; however, when the software reads from the coordinate address, the display adapter does not return the contents of the coordinate address. Instead, the adapter actually reads and returns the contents of the status address.

6 Claims, 4 Drawing Sheets

ACCELERATED INTERFACE BETWEEN PROCESSORS AND HARDWARE ADAPTERS

DESCRIPTION

BACKGROUND OF THE INVENTION

1. Field of the Invention

The present invention generally relates to providing a method of drawing graphic primitives on the display of graphics workstation computer and, more particularly, to an accelerated interface between the workstation processor and hardware adapters which provides a significant performance improvement when accessing different memory locations on a hardware adapter attached to the processor, by eliminating the need to synchronize the processor between memory accesses.

2. Description of the Prior Art

Computer graphics systems are widely used in business, science and technology. One of the more important applications of computer graphics systems is computer aided drafting and design (CAD) used to design mechanical, electrical, electro-mechanical and electronic devices. Typically, the design process involves an interactive computer model of the component or system being designed. A particular limitation on computer graphics systems has been the speed at which graphics primitives are drawn on the display screen. With the advent of the very high speed microprocessors now available for computer workstations, real time drawing and redrawing of the computer display is now possible.

To draw a graphics primitive on the screen, it is often necessary to write the coordinates to a coordinate address register in the hardware rasterizer of the display adapter, and then read the adapter status from a status address to begin the rendering. On some high performance reduced instruction set computer (RISC) microprocessors, accesses to different addresses are not guaranteed to occur in any particular order due to the pipeline architecture of these processors. Thus, the status read may actually occur before the coordinates are written, producing unpredictable results. To prevent this, these RISC microprocessors provide an assembler instruction to synchronize the central processing unit's (CPU's) multiple dispatch capabilities and the cache-inhibited memory-mapped input/output (I/O), including the reads and writes to the display adapter. Thus, to guarantee that the coordinates are written before the status is read, the software must write the coordinates to the display adapter rasterizer, synchronize the machine, and then read the adapter status. Because the hardware can handle a million primitives per second, the software must then synchronize the machine a million times per second, which adds a severe performance penalty.

SUMMARY OF THE INVENTION

It is therefore an object of the present invention to accelerate overall graphics performance in a computer graphics system by eliminating the need to synchronize the machine in performance-critical loops.

According to the invention, there is provided an accelerated interface between high performance microprocessors and hardware adapters which is a combination of hardware and software and which is independent of specific computer languages. In the preferred embodiments, the interface was specifically designed for RISC microprocessors such as used in the International Business Machines (IBM) RISC System/6000 Model 250 with the GXT150 graphics system. It may also be used for other graphics systems using different processors such as the 6XX family of PowerPC microprocessors jointly developed by IBM and Motorola. More generally, the invention can be used for any hardware attached to a CPU that does not enforce the order of memory accesses.

The invention provides a hardware supported process which fools the CPU into thinking that the write and read are accessing the same address, thus guaranteeing that the order of the write and read are correct. In a first method, a hardware pseudo-address are created on the display adapter. When the software writes to the pseudo-address, the adapter writes to the coordinate registers. When the software reads from the pseudo-address, the display adapter returns the contents of the actual status address. In the second method, the software writes and reads from the coordinate address; however, when the software reads from the coordinate address, the display adapter does not return the contents of the coordinate address. Instead, the adapter actually reads and returns the contents of the status address.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
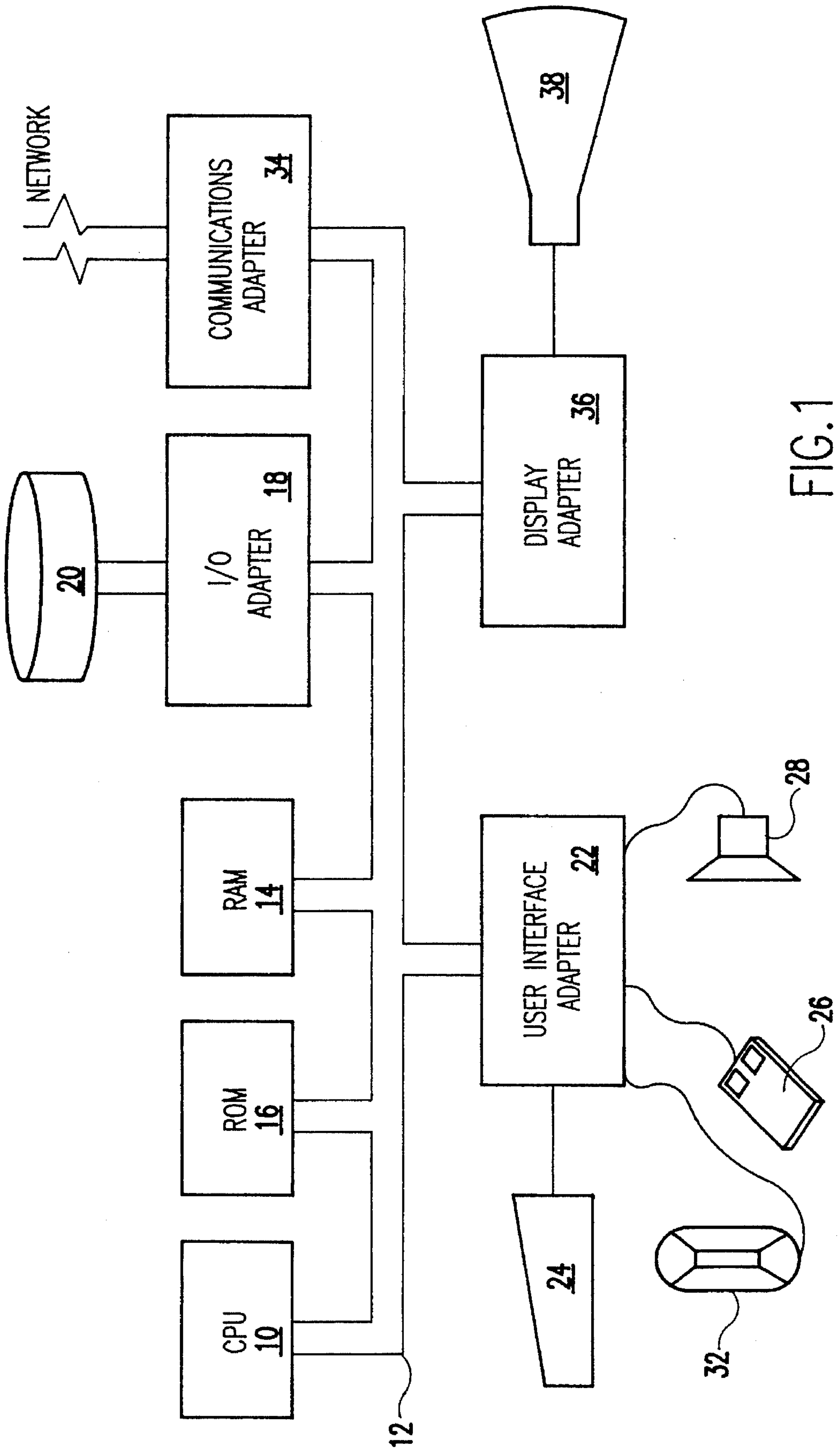
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a workstation such as the International Business Machines (IBM) Corporation's RS/6000 Workstations. The hardware includes a central processing unit (CPU) 10, which may be a reduced instruction set computer (RISC) microprocessor such as used in IBM's RISC System/6000 Model 250 or workstations using IBM's PowerPC microprocessor, and in particular the 6XX family of processors. The CPU 10 is attached to a system bus 12 to which are attached a random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. In the RISC System/6000 workstations, the OS is AIX, IBM's version of UNIX®. The I/O adapter 18 may support, for example, the Integrated Device Electronics (IDE) interface standard or the SCSI interface standard. In the former case, the I/O adapter 18 typically will support two disk drives in parallel, designated as drives "C:" and "D:". In the latter case, the I/O adapter 18 will support up to nine disk drives or other SCSI I/O devices connected in a daisy chain. The user interface adapter 22 has attached to it a keyboard 24, a mouse 26, a speaker 28, a microphone 32, and/or other user interface devices. The workstation additionally includes a display 38, here represented as a cathode ray tube (CRT) display but which may be a liquid crystal display (LCD). The display 38 is connected to the system bus 12 via a display adapter 36. Optionally, a communications adapter 34 is connected to the bus 12 and to a network, such as a local area network (LAN), such as IBM's Token Ring LAN. Alternatively, the communications adapter may be a modem connecting the personal computer or workstation to a telephone line as part of a wide area network (WAN).

Figure 2:
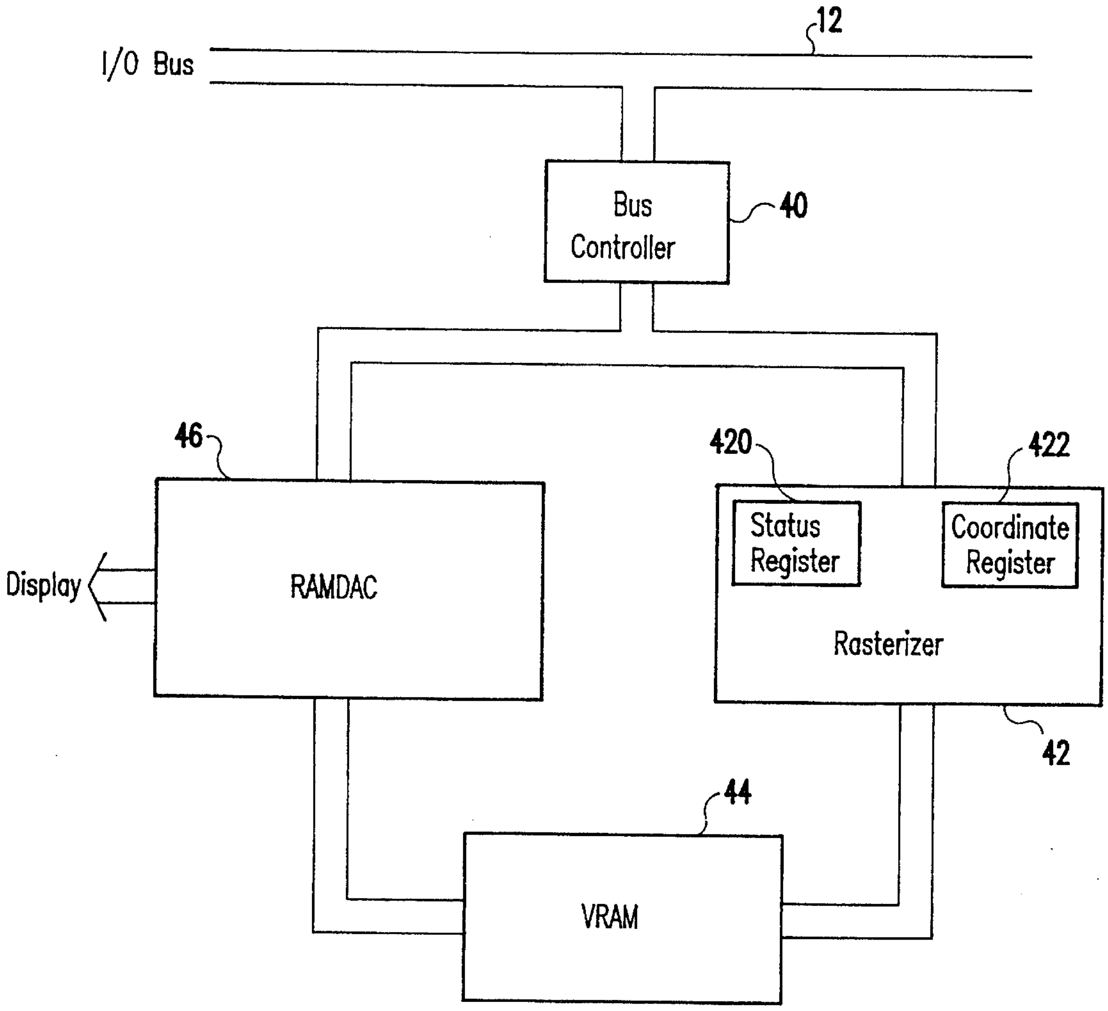
FIG. 2 is a block diagram showing the basic components of the display adapter.

The adapter 36 is shown in more detail in FIG. 2 and includes a bus controller 40 connected to the I/O bus 12 of the computer system shown in FIG. 1. The bus controller 40 routes display data to a rasterizer 42 having a status register 420 and a coordinate register 422. The rasterizer 42 converts data from bit mapped data to data for raster scanning, as required for cathode ray tube (CRT) displays, and stores the converted data in the video random access memory (VRAM) 44. The rasterized data in the VRAM 44 is supplied to a random access memory digital to analog to converter (RAMDAC) 46 under the control of the bus controller 40. The VRAM 44 serves as a refresh buffer for the RAMDAC 46 which generates the analog deflection and intensity signals that control the CRT display.

Figure 3:
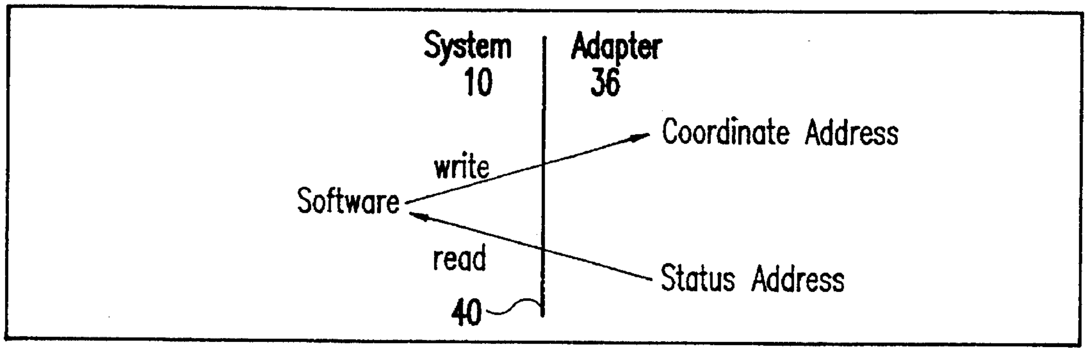
FIG. 3 is a diagram showing the interface process employed in the prior art method.

FIG. 3 shows in diagram form the prior art method of reading and writing to a coordinate address. As described above, to draw a graphics primitive on the screen of display 38, it is often necessary to write the coordinates to coordinate address register 422 and then read the status register 420 in the rasterizer 42 of adapter 36 to begin the rendering. FIG. 2 shows the interface in the form of bus controller 40 between the adapter 36 and the system CPU 10 as it executes the graphics software stored in RAM 14. On the 6XX family of PowerPC processors and similar RISC microprocessors, accesses to different addresses are not guaranteed to occur in any particular order. Thus, the status read may actually occur before the coordinates are written, producing unpredictable results. To prevent this, the 6XX processor provides an assembler instruction to synchronize the CPU's multiple dispatch capabilities and the cache-inhibited memory-mapped I/O, including the reads and writes to the adapter 36.

Figure 4:
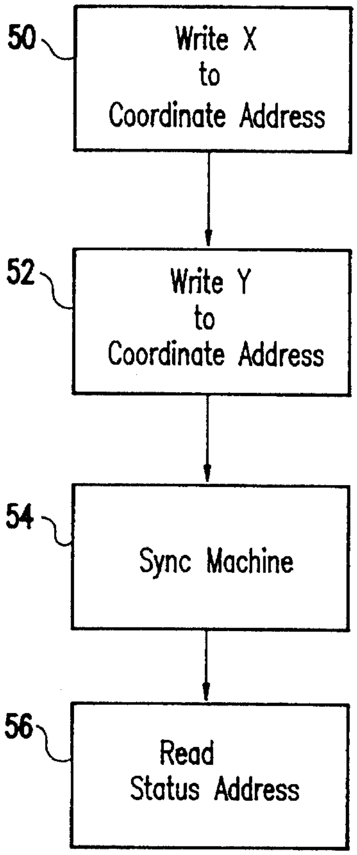
FIG. 4 is a flowchart showing the logic of the process according to the prior art method illustrated in FIG. 3.

The process is shown in FIG. 4. To initiate the drawing of a graphics primitive, the X coordinate is first written to the coordinate register 422 in function block 50. Next, the Y coordinate is written to the coordinate register 422 in function block 52. Because the coordinate and status addresses are different, the software must synchronize the machine after writing the coordinates to the coordinate register 422 of the adapter 36. This is shown by function block 54 in FIG. 4. Only after the machine has been synchronized can the software then read the status address in the status register 420 in order to guarantee that the coordinates are written before the status is read in function block 56. In high performance RISC microprocessor systems, the hardware can handle a million primitives per second, requiring the software to synchronize the machine between each write and read a million times per second, adding a severe performance penalty.

Figure 5:
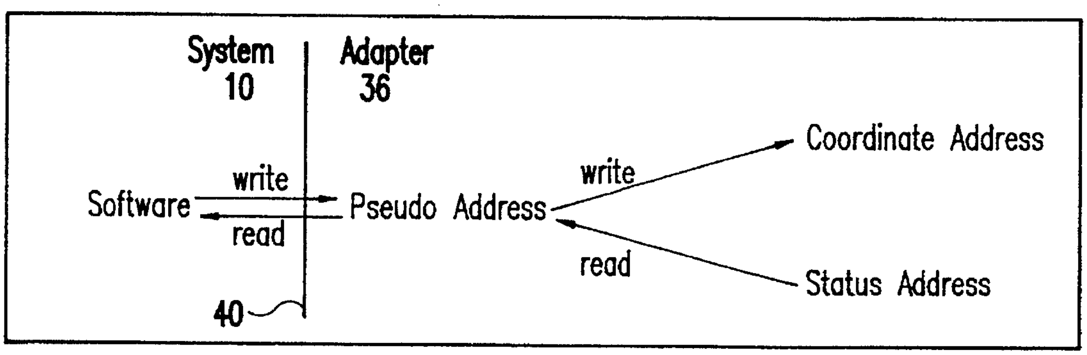
FIG. 5 is a diagram showing the interface process employed by a first method implemented by the present invention.

To avoid synchronizing the machine, the invention provides two methods. As shown in FIG. 5, the first method of eliminating the need to synchronizing the processor between memory accesses is illustrated. A pseudo-address creates the illusion of writing to the and reading from the same address in the adapter 36. No synchronization is necessary. In addition, the software may still accesses the real addresses.

More particularly, a hardware pseudo-address on the adapter 36 is created. When the software writes coordinates to this address, the adapter 36 transfers the dam to the actual coordinate address. When the software reads from the pseudo-address, the adapter 36 returns the contents of the actual status address. By doing this, the CPU 10 is fooled into thinking that the write and read are accessing the same address, and thus the order of the write and read is guaranteed to be correct.

The actual coordinate and status addresses are not affected, and they can still be accessed by the software, in addition to the pseudo-address. Addressing the actual addresses may be helpful during software debug, for instance.

Figure 6:
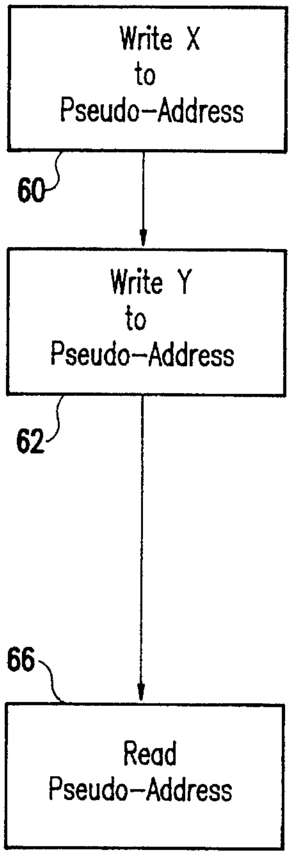
FIG. 6 is a flowchart showing the logic of the process illustrated in FIG. 5.

The process according to the first method is illustrated in the flow chart of FIG. 6. The system first writes the X coordinate to a pseudo-address in function block 60 and then writes the Y coordinate to the pseudo-address in function block 62. When the software writes to the pseudo-address, the bus controller 40 writes to the coordinate register 422, and when the software reads the pseudo-address, the bus controller 40 returns the contents of the status register 420. Now, when the system reads the status at the pseudo-address in function block 66, it is not necessary to resynchronize the machine since the write and read operations are to the same address.

Figure 7:
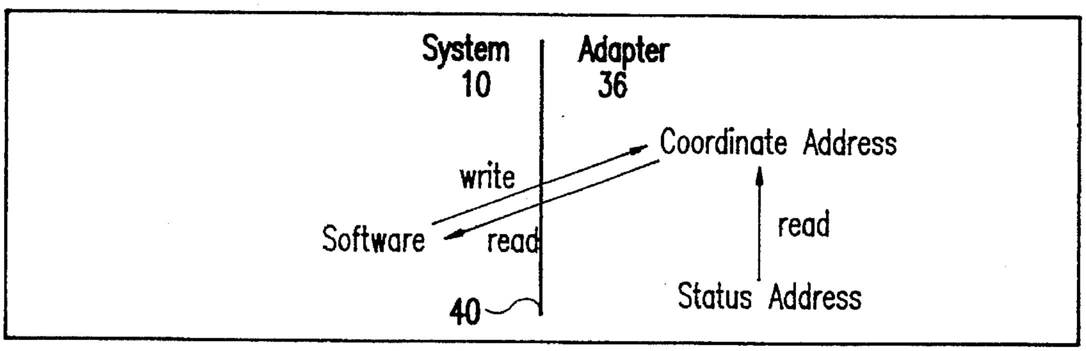
FIG. 7 is a diagram showing the interface process employed by a second method implemented by the present invention.

In FIG. 7, the second method is illustrated. The software writes and reads from the coordinate address, but for reads, the adapter 36 actually returns the contents of the status address. The software can access the status address directly if so desired, but it can never read the contents of the coordinate address.

The software continues to write coordinates to the coordinate address. However, when the software reads from the coordinate address, the adapter 36 does not return the contents of the coordinate address. Instead, the adapter actually reads and returns the contents of the status address, as shown in FIG. 5. Again, the CPU 10 is fooled into thinking that the write and read are accessing the same address, and thus the order of the write and read is guaranteed to be correct.

Figure 8:
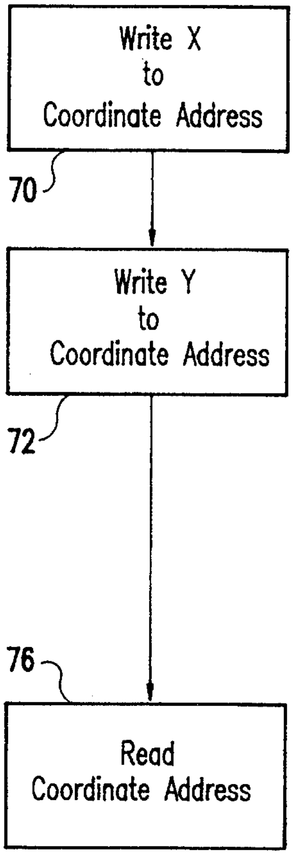
FIG. 8 is a flowchart showing the logic of the process illustrated in FIG. 7.

The process according to the second method is illustrated in the flow chart of FIG. 8. As in the prior method, the software writes the X coordinate to the coordinate register 422 in function block 70 and writes the Y coordinate to the coordinate register 422 in function block 72. However, now the software attempts to read the coordinate register in function block 76, but when the a read of the coordinate register is attempted, the bus controller 40 returns the contents of the status register 420. Again, since the software is writing and reading the same address, it is not necessary to resynchronize the machine as in the prior method.

The disadvantage of this second method compared to the first method is that the software is never able to read the contents of the coordinate address. Except for debug purposes, though, obtaining the contents of the coordinate address should never be necessary anyway.

While the invention has been described in terms of alternate methods as the preferred embodiments, those skilled in the art will recognize that the invention can be practiced with modification within the spirit and scope of the appended claims.

Having thus described our invention, what we claim as new and desire to secure by Letters patent is as follows:

1. A computer graphics system comprising:

a central processing unit (CPU) having an architecture which does not enforce an order of memory accesses;

a random access memory (RAM) storing a graphics software program including processes for drawing graphics primitives, said CPU accessing the RAM to run the graphics software; and a display adapter connected to said CPU and including a hardware rasterizer having a coordinate register and a status register respectively storing graphics primitives coordinates and a status address, said CPU writing coordinates of said graphics primitives and reading the status by accessing a same address of said display adapter, the display adapter responding to the write and read accesses of the CPU to provide a hardware interface that makes writes and reads appear to be accessing the same address, thus guaranteeing that the order of write and read are correct.

2. The computer graphics system recited in claim 1 wherein the CPU executes software which writes said coordinates to a pseudo-address and reads status by accessing said pseudo-address, the display adapter writing data to the coordinate register when the software writes to the pseudo-address and the display adapter returning the contents of the actual status address from the status register when the software reads from the pseudo-address.

3. The computer graphics system recited in claim 1 wherein the CPU executes software which writes said coordinates to a coordinate address and reads status by accessing said coordinate address, the display adapter reading and returning the contents of the status address from the status register when the software reads from the coordinate address.

4. In a computer graphics system comprising a central processing unit (CPU) having an architecture which does not enforce an order of memory accesses, a random access memory (RAM) storing a graphics software program including processes for drawing graphics primitives, said CPU accessing the RAM to run the graphics software, and a display adapter connected to said CPU and including a hardware rasterizer having a coordinate register and a status register respectively storing graphics primitives coordinates and a status address, a method of accelerating the performance of the computer graphics system comprising the steps of:

writing by the CPU coordinates of said graphics primitives to an address of said display adapter;

reading by the CPU the status of the display adapter by accessing said address of said display adapter; and responding by the display adapter to the write and read accesses of the CPU by respectively storing said coordinates in said coordinate register and returning the contents of the status register to provide a hardware interface that makes writes and reads appear to be accessing the same address, thus guaranteeing that the order of write and read are correct.

5. The method recited in claim 4 wherein the CPU executes software which writes said coordinates to a pseudo-address and reads status by accessing said pseudo-address, the display adapter writing data to the coordinate register when the software writes to the pseudo-address and the display adapter returning the contents of the actual status address from the status register when the software reads from the pseudo-address.

6. The method recited in claim 4 wherein the CPU executes software which writes said coordinates to a coordinate address and reads status by accessing said coordinate address, the display adapter reading and returning the contents of the status address from the status register when the software reads from the coordinate address.

* * * * *